(12) United States Patent
Lamparter

(10) Patent No.: US 7,784,867 B2
(45) Date of Patent: Aug. 31, 2010

(54) SEAT ASSEMBLY FOR A VEHICLE

(75) Inventor: Ronald C. Lamparter, Gross Pointe Shores, MI (US)

(73) Assignee: Syntec Seating Solutions, LLC, Sterling Heights, MI (US)

( * ) Notice: Subject to any disclaimer, the term of this patent is extended or adjusted under 35 U.S.C. 154(b) by 0 days.

(21) Appl. No.: 12/040,153

(22) Filed: Feb. 29, 2008

(65) Prior Publication Data
US 2008/0211219 A1 Sep. 4, 2008

Related U.S. Application Data

(60) Provisional application No. 60/892,543, filed on Mar. 2, 2007, provisional application No. 60/966,403, filed on Aug. 28, 2007.

(51) Int. Cl.
*A47C 15/00* (2006.01)
*A47C 31/00* (2006.01)

(52) U.S. Cl. .................. 297/233; 297/468; 297/483; 297/248; 297/118

(58) Field of Classification Search .................. 297/483, 297/486, 468, 481, 232, 233, 248, 482, 485, 297/118, 473; 280/801.1, 808
See application file for complete search history.

(56) References Cited

U.S. PATENT DOCUMENTS

| | | |
|---|---|---|
| 3,287,061 A | 11/1966 | Nicholas |
| 3,385,633 A | 5/1968 | Aizley |
| 3,768,862 A | 10/1973 | Williams, Jr. |
| 3,832,002 A | 8/1974 | Eggert, Jr. et al. |
| 4,218,091 A | 8/1980 | Webster |
| 4,225,178 A | 9/1980 | Takada |
| 4,533,110 A | 8/1985 | Hill |
| 4,810,037 A | 3/1989 | Takagi |
| 4,919,488 A | 4/1990 | Deegener et al. |
| 5,009,469 A | 4/1991 | Mouri |
| 5,044,695 A | 9/1991 | Tsuchiya |
| 5,066,043 A | 11/1991 | Tokugawa |
| 5,088,794 A | 2/1992 | Iwami et al. |
| 5,139,311 A | 8/1992 | Imai et al. |
| 5,253,924 A | 10/1993 | Glance |
| 5,318,341 A | 6/1994 | Griswold et al. |
| 5,320,411 A | 6/1994 | Sera |

(Continued)

FOREIGN PATENT DOCUMENTS

FR 2658459 A1 * 8/1991

(Continued)

*Primary Examiner*—Sarah B McPartlin
(74) *Attorney, Agent, or Firm*—Howard & Howard Attorneys PLLC

(57) ABSTRACT

A seat assembly for a vehicle, such as a school bus, accommodates two or three passengers, depending on the size and stature of the passengers. The seat assembly is equipped with three seatbelts and five buckles spaced along a seatback. When three passengers are utilizing the seat assembly, each of the three seatbelts and three of the buckles are utilized. When two passengers are utilizing the seat assembly, two of the seatbelts and the remaining two buckles are utilized. The seatbelts and buckles are visually coded and/or keyed to prevent improper use. When the buckles are not being utilized, they are housed in cavities formed in the seatback to avoid interference with the passengers.

14 Claims, 7 Drawing Sheets

U.S. PATENT DOCUMENTS

| | | | |
|---|---|---|---|
| 5,328,249 A | 7/1994 | Ball | |
| 5,340,185 A | 8/1994 | Vollmer | |
| 5,364,170 A | 11/1994 | West | |
| 5,366,268 A | 11/1994 | Miller et al. | |
| 5,462,332 A | 10/1995 | Payne et al. | |
| 5,575,533 A | 11/1996 | Glance | |
| 5,641,198 A | 6/1997 | Steffens, Jr. | |
| 5,722,731 A * | 3/1998 | Chang | 297/473 |
| 5,971,490 A * | 10/1999 | Chang | 297/473 |
| 6,022,074 A | 2/2000 | Swedenkleff | |
| 6,113,185 A | 9/2000 | Yamaguchi et al. | |
| 6,164,720 A | 12/2000 | Haglund | |
| 6,217,068 B1 * | 4/2001 | Trainum et al. | 280/801.1 |
| 6,312,056 B1 | 11/2001 | Murphy et al. | |
| 6,328,386 B1 | 12/2001 | Good | |
| 6,412,876 B2 | 7/2002 | Nishide | |
| 6,485,098 B1 | 11/2002 | Vits et al. | |
| 6,508,515 B2 | 1/2003 | Vits et al. | |
| 6,554,356 B1 | 4/2003 | Crose | |
| 6,604,599 B2 | 8/2003 | Yamaguchi et al. | |
| 6,648,409 B1 | 11/2003 | Laporte | |
| 6,676,219 B1 | 1/2004 | Brewer | |
| 6,688,685 B2 | 2/2004 | Kain | |
| 6,739,673 B2 | 5/2004 | Gupta et al. | |
| 6,779,841 B2 | 8/2004 | Eckendorff | |
| 6,811,186 B1 | 11/2004 | Fraley et al. | |
| 6,817,672 B2 | 11/2004 | Matsunuma | |
| 6,837,540 B2 | 1/2005 | Yamaguchi et al. | |
| 6,886,889 B2 | 5/2005 | Vits et al. | |
| 6,908,149 B1 | 6/2005 | Yamaguchi et al. | |
| 6,938,959 B1 | 9/2005 | Borunda et al. | |
| 6,991,286 B2 | 1/2006 | Nelson et al. | |
| 7,000,994 B2 * | 2/2006 | Leighton | 297/484 |
| 7,029,067 B2 | 4/2006 | Vits et al. | |
| 7,040,696 B2 | 5/2006 | Vits et al. | |
| 7,055,905 B2 | 6/2006 | Spey et al. | |
| 7,059,675 B2 | 6/2006 | Nelson et al. | |
| 7,063,389 B2 | 6/2006 | Kennedy, Sr. | |
| 7,131,668 B2 | 11/2006 | Go | |
| 7,195,316 B2 | 3/2007 | Shimaski et al. | |
| 7,229,135 B2 | 6/2007 | Hyatt et al. | |
| 7,338,119 B2 | 3/2008 | Burch | |
| 7,354,105 B2 | 4/2008 | Nelson et al. | |
| 7,500,722 B2 * | 3/2009 | Morris | 297/483 |
| 2002/0079734 A1 | 6/2002 | Murphy et al. | |
| 2004/0004381 A1 | 1/2004 | Timon | |
| 2004/0183344 A1 | 9/2004 | Glance et al. | |
| 2005/0168041 A1 | 8/2005 | Glance et al. | |
| 2005/0184577 A1 | 8/2005 | Nelson et al. | |
| 2005/0189800 A1 | 9/2005 | Nelson et al. | |
| 2005/0189801 A1 | 9/2005 | Mattes et al. | |
| 2005/0189802 A1 | 9/2005 | Mattes et al. | |
| 2005/0200172 A1 | 9/2005 | Graham et al. | |
| 2005/0206150 A1 * | 9/2005 | Yamaguchi et al. | 280/801.1 |
| 2006/0267390 A1 | 11/2006 | Epaud | |
| 2008/0191540 A1 * | 8/2008 | Morris | 297/474 |
| 2009/0072608 A1 * | 3/2009 | Marriott et al. | 297/481 |

FOREIGN PATENT DOCUMENTS

WO     WO 2008/027832 A2 *    3/2008

* cited by examiner

US 7,784,867 B2

SEAT ASSEMBLY FOR A VEHICLE

CROSS REFERENCE TO RELATED APPLICATION

This application claims the benefit of U.S. Provisional Application No. 60/892,543 filed Mar. 2, 2007, and U.S. Provisional Application No. 60/966,403 filed Aug. 28, 2007, both of which are incorporated herein by reference.

BACKGROUND OF THE INVENTION

1. Field of the Invention

The subject invention relates generally to a seat assembly for a vehicle.

2. Description of the Related Art

School bus bodies are generally standardized and generally have a common width, which means that the width of seats installed in the school bus is also generally standardized. In spite of this standardized seat width, if the school bus is used to transport grade school children, which typically have a smaller stature, then each of the seats will often accommodate three passengers. On the other hand, if the school bus is used to transport larger high school children, which typically have a larger stature, then each of the seats will accommodate only two passengers on each of the seats.

Each of the seats includes a seat bottom and a seatback, which are essentially flat. Accordingly, accommodating either two or three passengers on each seat is simply a matter of the seat width being able to accommodate the combined width of passengers sitting in the seat. In other words, the seats are designed to accommodate either two or three passengers, and are not customized to accommodate a pre-determined number of passengers. This has always provided school bus operators with scheduling flexibility, and has until recently not created any problems.

Recently, however, a longstanding debate as to whether school buses should be equipped with seatbelt assemblies has intensified, with those favoring seatbelt assembly usage on the school buses now prevailing. As a result, more and more school buses are now being equipped with seatbelt assemblies. Public pressure is building to require all school buses be equipped with seatbelt assemblies. A strong consensus has already developed requiring the seatbelt assemblies include a lap/shoulder belt combination similar to designs now installed in most modern automobiles.

However, this creates a very serious problem for the school bus industry because the school bus seats are now becoming customized with equipment to accommodate either two larger passengers or three smaller passengers, but not both. If the school bus seats are equipped to accommodate the three smaller passengers, the seatbelt assembly equipment is not properly positioned for use by the larger passengers. If the school bus seats are equipped to accommodate the two larger passengers, the capacity of the school bus is reduced. The reduced capacity requires school districts to increase the number of school buses to transport the same number of children, which is an expensive option for school districts.

Accordingly, it would be advantageous to provide a seat assembly that includes seatbelt assemblies that are configured to accommodate two larger passengers or three smaller passengers.

SUMMARY OF THE INVENTION AND ADVANTAGES

The subject invention provides a seat assembly for a vehicle. The seat assembly includes a seat having a seat bottom and a seatback with the seat extending between a first side and a second side for accommodating at least one passenger. A first seatbelt is disposed in proximity to the first side of the seat and a second seatbelt is disposed in proximity to the second side of the seat. A third seatbelt is disposed between the sides of the seat. A first buckle, a second buckle, a third buckle, a fourth buckle, and a fifth buckle are disposed in proximity to the seat and arranged sequentially from the first side of the seat to the second side of the seat. A first clip is coupled with the first seatbelt and engageable with the first and second buckles for securing a first passenger in the seat with the first seatbelt. A second clip is coupled with the second seatbelt and engageable with the third and fifth buckles for securing a second passenger in the seat with the second seatbelt. A third clip is coupled with the third seatbelt and engageable with the fourth buckle for securing a third passenger in the seat with the third seatbelt.

By utilizing five buckles in concert with three seatbelts, the seat assembly may accommodate three passengers of smaller stature or two passengers of larger stature. Therefore, a single school bus, or other vehicle, utilizing this seat assembly may service both grade school children, who typically have a smaller stature, and high school children, who typically have a larger stature. Specifically, the subject invention allows both categories of passengers to be secured to the seat with a seatbelt.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
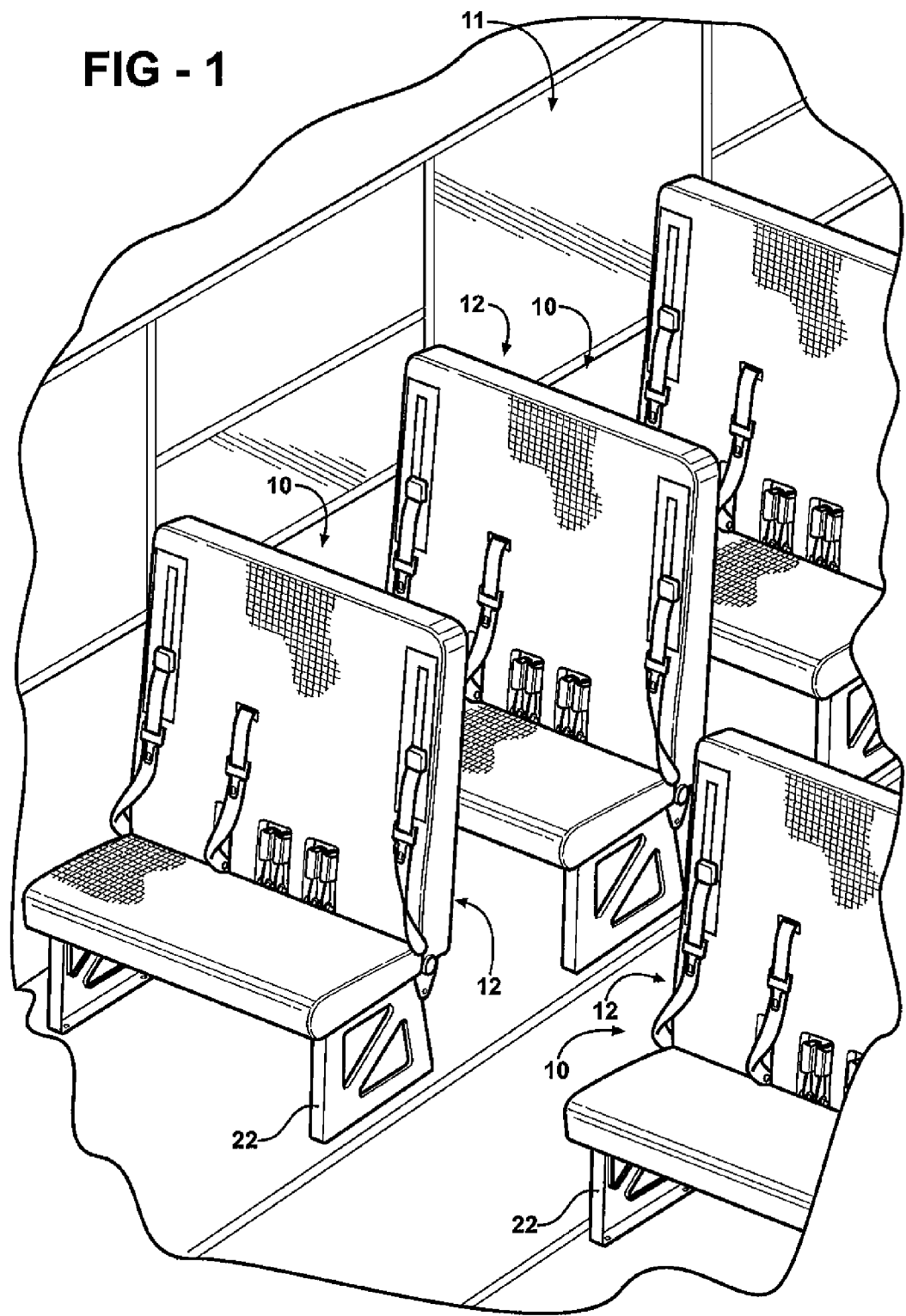
FIG. 1 is a perspective view of a vehicle implementing a plurality of seat assemblies.

Referring to the Figures, wherein like numerals indicate corresponding parts throughout the several views, a seat assembly is shown at 10. The seat assembly 10 is typically disposed in a vehicle such as, for example, for a standard school bus 11. Accordingly, as is known in the art, several seats assemblies 10 will be incorporated into the school bus 11 in rows, as is shown in FIG. 1. It should be appreciated that the seat assembly 10 may be used in any type of vehicle including, for example, an automobile, an airplane, and a boat.

Figure 2:
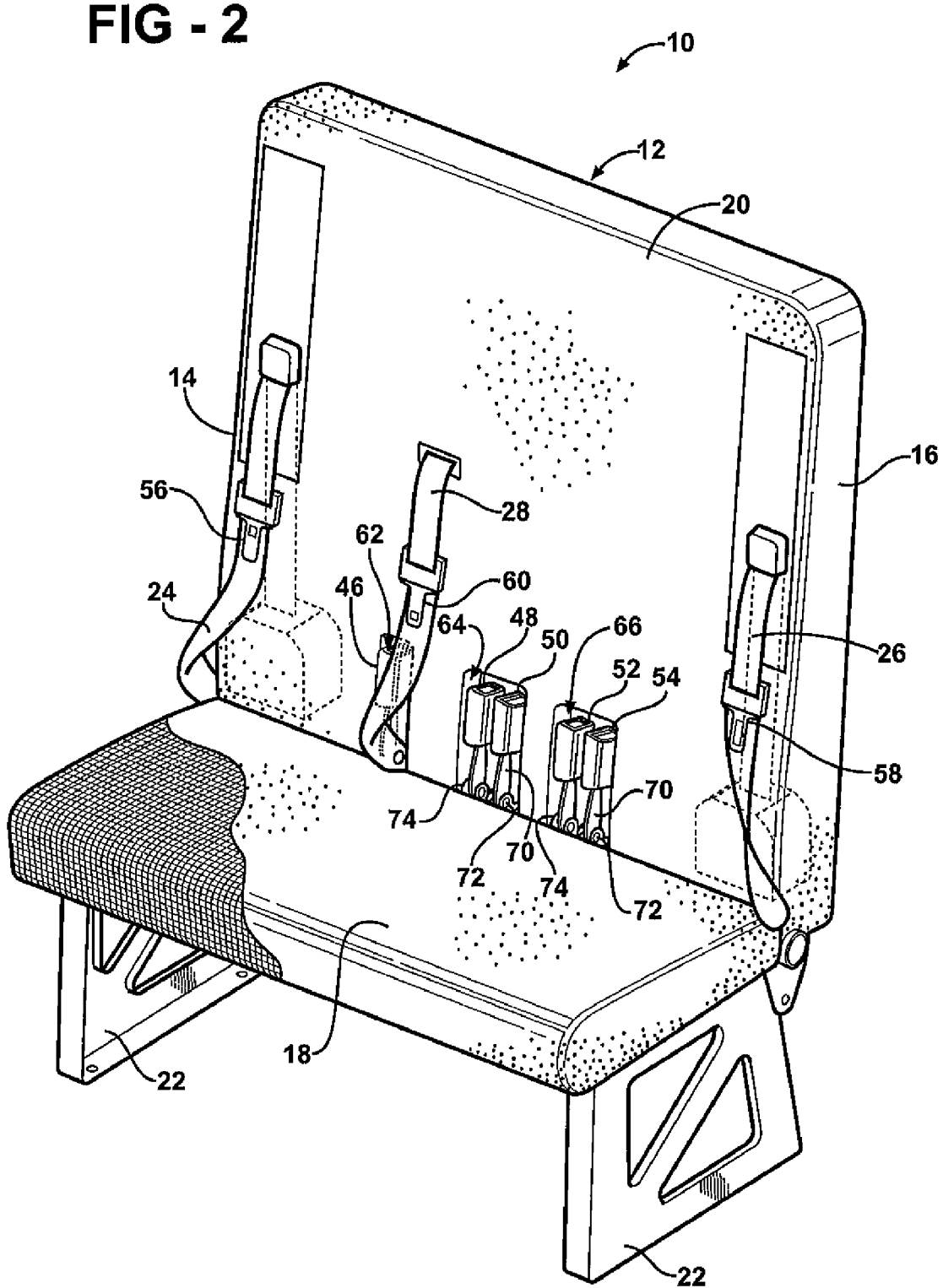
FIG. 2 is a perspective view of a seat assembly showing a seat with three seatbelts and five buckles.
Figure 3:
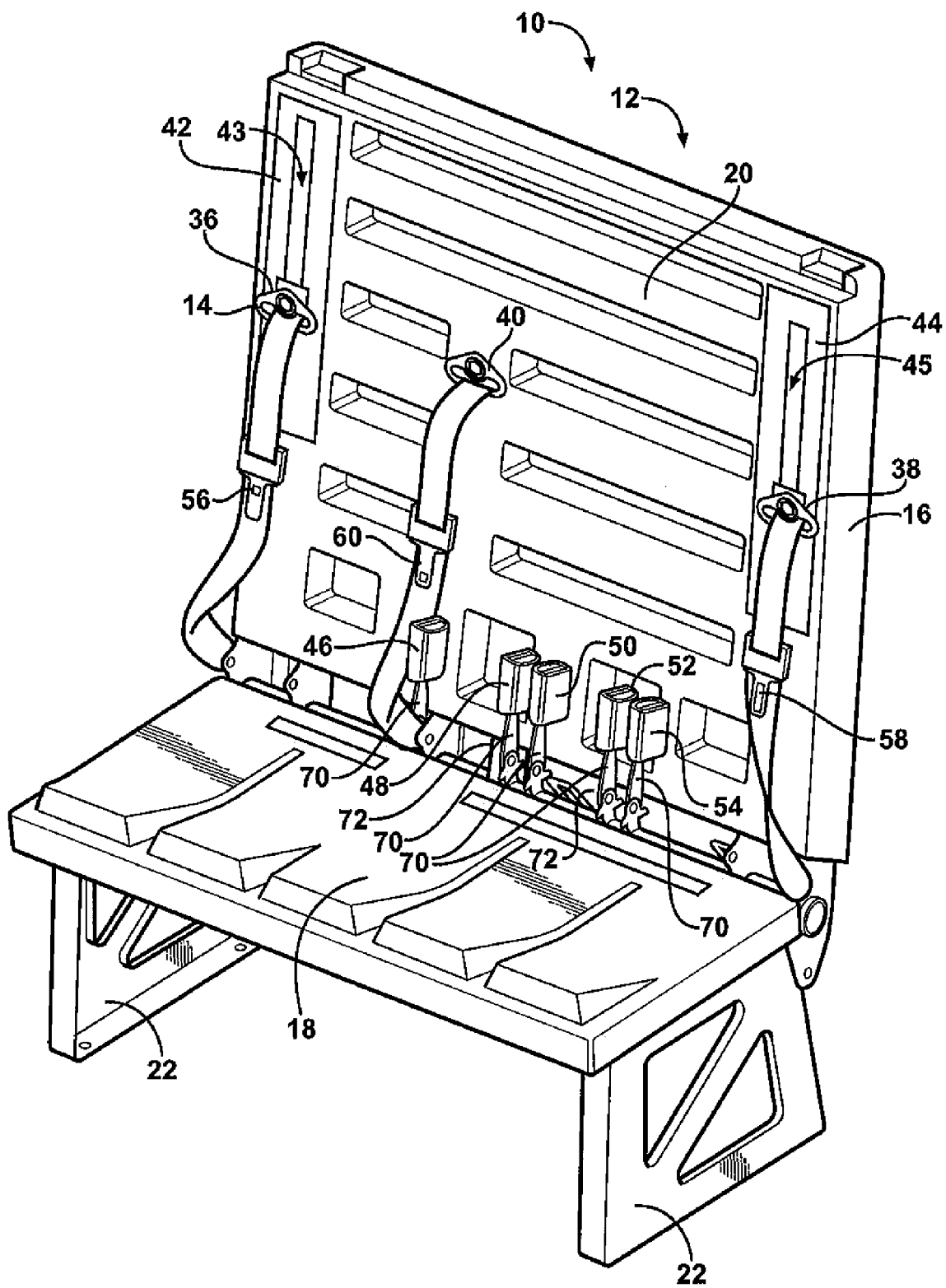
FIG. 3 is a perspective view of the seat assembly without covering on a frame of the seat.

Referring now to FIGS. 2 and 3, the seat assembly includes a seat 12 extending between a first side 14 and a second side 16. The seat includes a seat bottom 18 extending generally horizontally and a seatback 20 extending generally vertically, as is commonly known. The seat bottom 18 and seatback 20 are preferably covered with a covering (not numbered) and/or cushion (not shown) over a frame (not numbered). The seat bottom 18 may include any structure commonly utilized. The seat bottom 18 typically includes the frame formed of metal or another suitable material. The seat bottom 18 may be inclined to form a ramp (not numbered) along a front edge (not numbered) for urging passengers seated in the seat 12 toward the seatback 20 and to reduce the likelihood that the passenger uncontrollably moves forward and strikes the seatback 20 in front of the passenger when the vehicle is stopped abruptly, i.e., also referred to in industry as "submarining." The seat assembly 10 typically includes mounting pedestals 22 attached to and extending downwardly from the seat bottom. The mounting pedestals 22 may be mounted to a floor of the vehicle.

Figure 4:
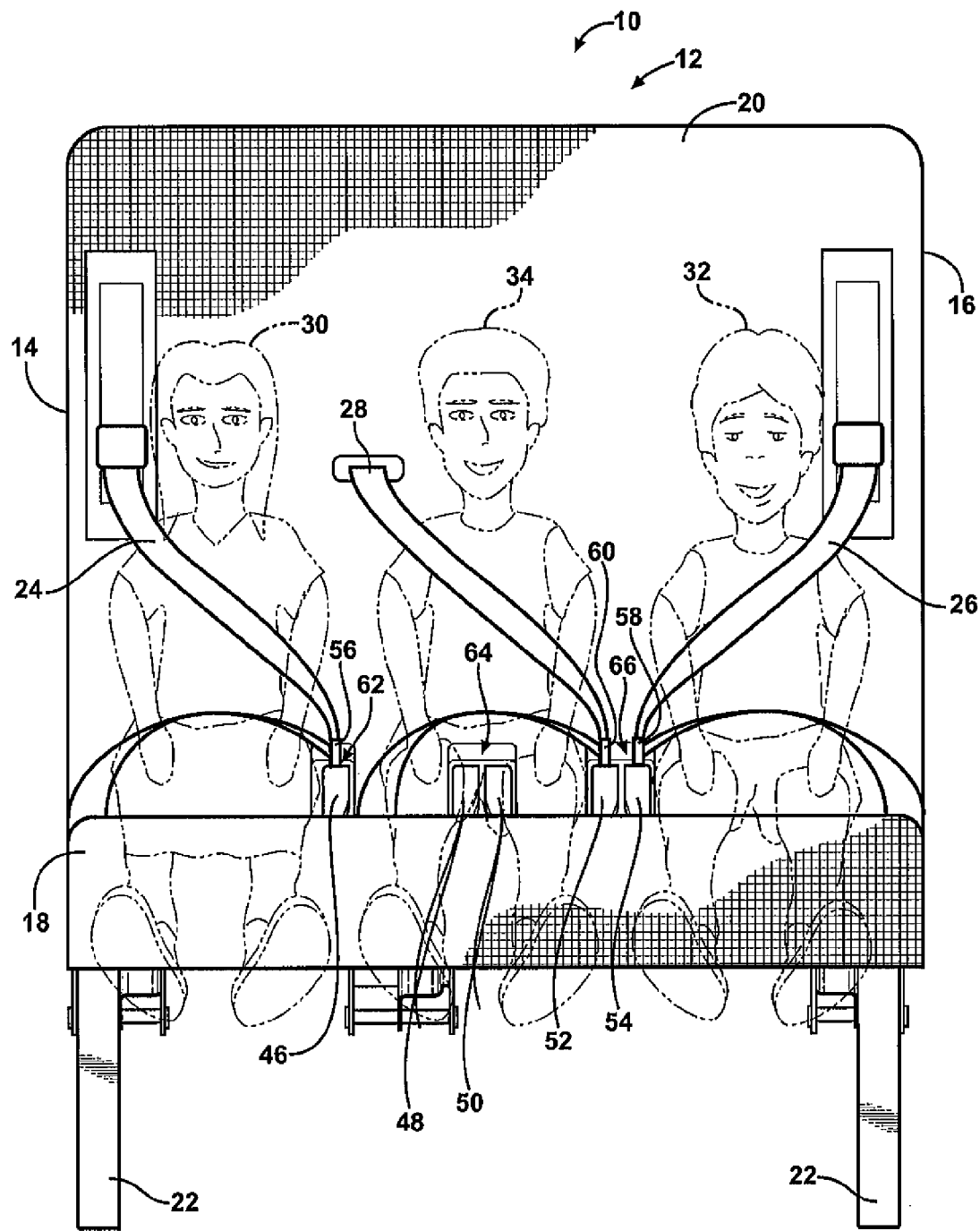
FIG. 4 is a front view of a three passenger configuration of the seat assembly showing three passengers secured in the seat.
Figure 5:
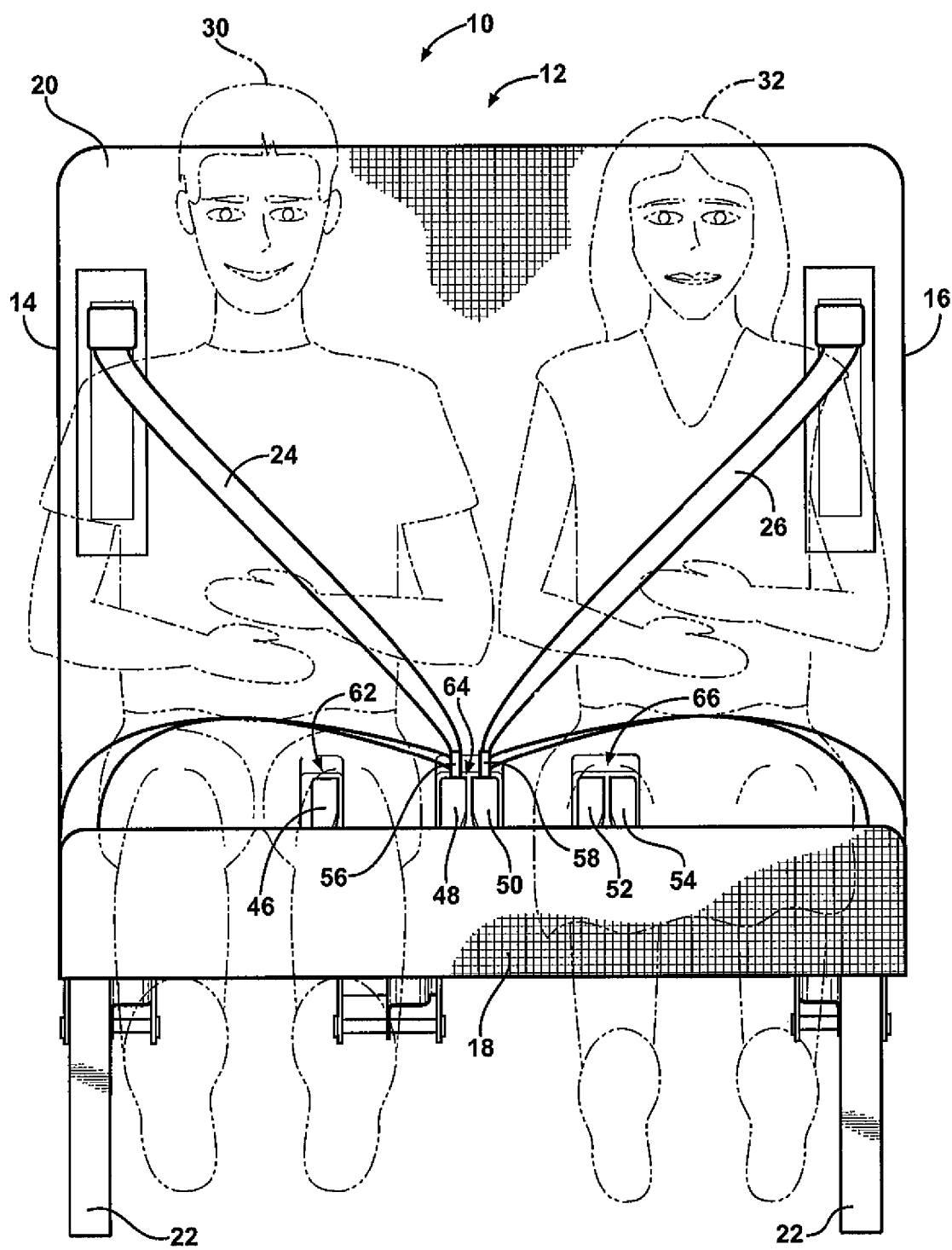
FIG. 5 is a front view of a two passenger configuration of the seat assembly showing two passengers secured in the seat.

The seat assembly 10 shown in the illustrated embodiments is configured to hold one, two, or three passengers. Specifically, the seat assembly 10 optimally secures three passengers of smaller stature, e.g., grade school students, in a three passenger configuration, as shown in FIG. 4, or two passengers of larger stature, e.g., high school students or adults, in a two passenger configuration, as shown in FIG. 5. However, those skilled in the art will realize that the seat assembly 10 may be configured to secure additional passengers in a wider seat 12 using the teachings set forth herein.

The seat assembly 10 includes a plurality of seatbelt assemblies (not numbered) for securing one or more passengers 30, 32, 34 in the seat 12. Each seatbelt assembly includes a retractor (not numbered) and a seatbelt 24, 26, 28, selectively extendable from the retractor. Specifically, in the illustrated embodiment, the seat assembly 10 includes a first seatbelt 24, a second seatbelt 26, and a third seatbelt 28. The first seatbelt 24 is disposed in proximity to the first side 14 of the seat 12. The second seatbelt 26 is disposed in proximity to the second side 16 of the seat 12. The third seatbelt 28 is disposed between the sides 14, 26 of the seat 12 and preferably between the first and second seatbelts 24, 26. In the illustrated embodiments, each seatbelt 24, 26, 28 is supported by the seat 12. Particularly, one end (not numbered) of each seatbelt 24, 26, 28 is fastened to the seat 12. However, in alternative embodiments (not shown), one or more of the seatbelts 24, 26, 28 may be fastened elsewhere, such as, the floor or side walls of the vehicle.

The seat assembly 10 preferably includes a plurality of shoulder retainers 36, 38, 40 as can be seen in FIG. 3. Each shoulder retainer 36, 38, 40 receives one of the seatbelts 24, 26, 28 as is well known to those skilled in the art. Each shoulder retainer 36, 38, 40 allows the associated seatbelt 24, 26, 28 to engage a shoulder area of the passenger 30, 32, 34 that is secured using the seatbelt 24, 26, 28. In the illustrated embodiment, a first shoulder retainer 36 receives the first seatbelt 24, a second shoulder retainer 38 receives the second seatbelt 26, and a third shoulder retainer 40 receives the third seatbelt 28. Each shoulder retainer 36, 38, 40 is operatively connected to and supported by the seat 12, specifically, the seatback 20. However, those skilled in the art realize other configurations where one or more of the shoulder retainers 36, 38, 40 are not supported by the seat 12. Furthermore, the seat assembly 10 may be implemented without the shoulder retainers 36, 38, 40 such as with seatbelts 24, 26, 28 securing only the waist of the passenger 30, 32, 34, i.e., a "lap belt".

Figure 6:
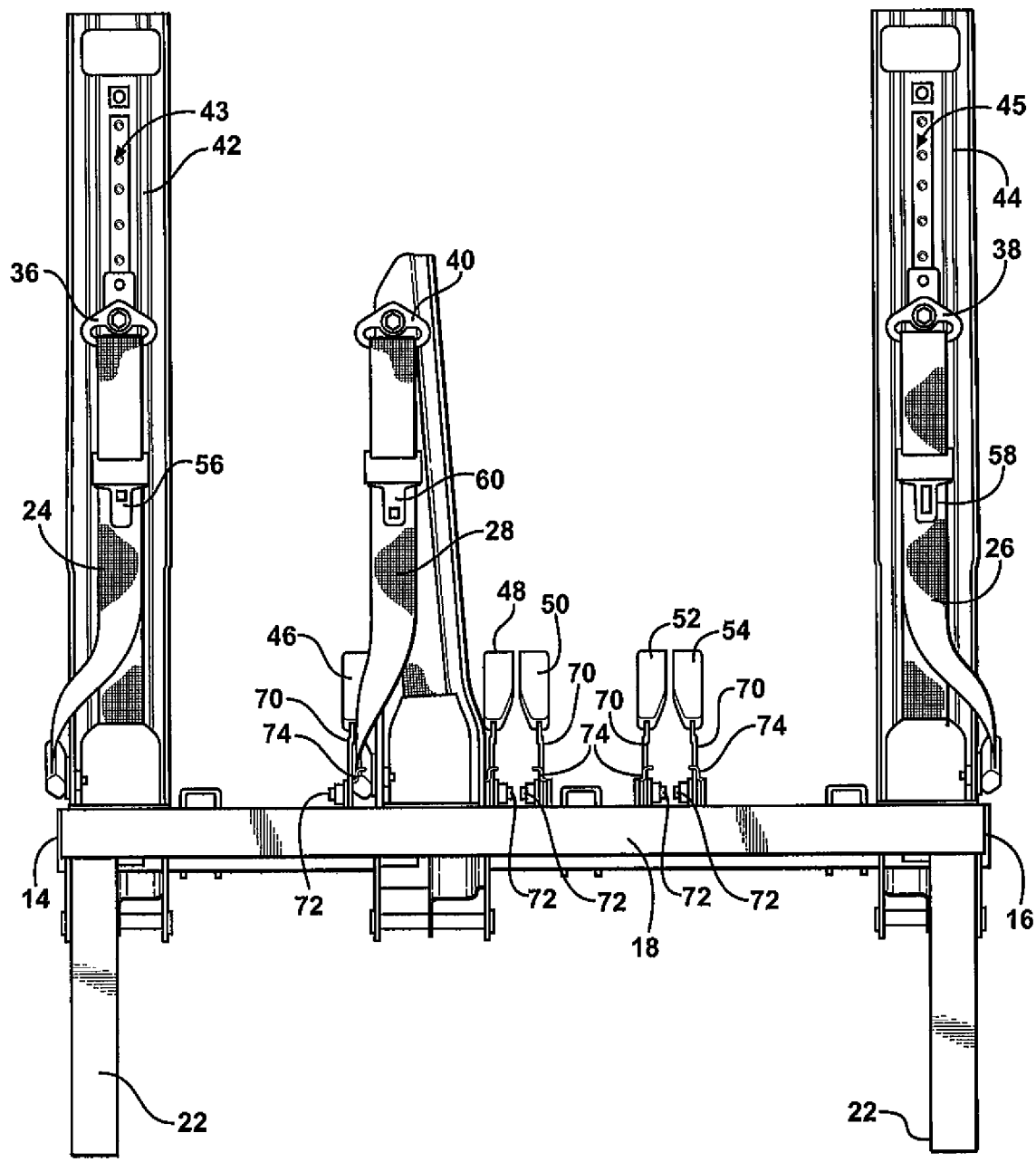
FIG. 6 is a front view of the seat assembly without a seatback to reveal belt height adjusters disposed within the seatback.

The seat assembly 10 preferably also includes at least one belt height adjuster 42, 44, as is best seen in FIG. 6. Each belt height adjuster 42, 44 supports one of the shoulder retainers 36, 38 and allows adjustment of the shoulder retainer 36, 38 to accommodate passengers of various sizes. Specifically, each belt height adjuster 42, 44 defines a slot 43, 45, such that the shoulder retainer 36, 38 may move generally vertically. In the illustrated embodiment, a first belt height adjuster 42 supports the first shoulder retainer 36 and a second belt height 44 adjuster supports the second shoulder retainer 38. The third shoulder retainer 40 is not supported by a belt height adjuster in the illustrated embodiment since it is contemplated that the third seatbelt 28 will be typically only used by a smaller-stature passenger. However, implementation of a belt height adjuster for the third should retainer 40, of course, may be achieved.

More specifically, with respect to the belt height adjuster 42, 44, as best shown in FIG. 6, the seatback 20 includes a seatback frame (not numbered). The seatback frame defines a track and a plurality of indentations along the track. The belt height adjuster 42, 44 includes a slider slideably engaging the track and a pin selectively engageable with the indentations for fixing the slider at fixed positions along the seatbelt frame. It should be appreciated the embodiment including the indentations along the track is exemplary and that the movement of the belt height adjuster 42, 44 along the seatback frame can be accomplished in any fashion without departing from the nature of the present invention. For example, the belt height adjuster 42, 44 can be adjustable along an infinite number of positions along the seatback frame and can be maintained in any of the infinite number of positions by frictionally engaging the seatback frame.

The seatback frame includes three towers spaced from each other along the seat bottom 18. More specifically, two of the towers are disposed on opposing ends of the seat bottom 18 and one of the towers is disposed on the seat bottom 18 approximately ⅓ of a distance from one to the other of the opposing ends. The towers each define a channel. The respective retractor is mounted at a bottom of the tower in the channel and the respective seatbelt 24, 26, 28 extends from the retractor to the shoulder retainer 36, 38, 40 in the channel. Specifically, the seatback frame has a first edge extending along an axis, a second edge spaced from the first edge and extending along the axis, and a surface extending from the first edge to the second edge defining the channel between the first edge and the second edge.

As best shown in FIG. 3, the seat assembly 10 includes a rigid cover (not numbered) having an inner surface defining a void and the void receives the seatback frame. The rigid cover provides a surface for the passengers to rest their back against. The rigid cover rigidly couples the three towers to each other. The inner surface extends from the first edge to the second edge of each tower for enclosing the seatbelt 24, 26, 28 in the channel between the retractor and the shoulder retainer 36, 38, 40. Specifically, the inner surface of the rigid cover contacts the first and second edges of each tower.

The cover defines an opening and the seatbelt 24, 26, 28 extends from the channel through the opening. The belt height adjusters 42, 44 are selectively moveable along the opening.

The cover structurally reinforces the seatback 20. In other words, the cover ties together the towers to reinforce the seatback 20. The cover is typically formed of plastic; however, it should be appreciated that the cover may be formed of any material and by any method.

The seat assembly 10 further includes a plurality of buckles 46, 48, 50, 52, 54. Specifically, the seat assembly 10 includes a first buckle 46, a second buckle 48, a third buckle 50, a fourth buckle 52, and a fifth buckle 54. The buckles 46, 48, 50, 52, 54 are disposed in proximity to the seat 12 and arranged sequentially from the first side 14 to the second side 16 of the seat 12.

In the illustrated embodiment, the second and third buckles 48, 50 are preferably positioned adjacent one another as a first pair of buckles (not numbered) and the fourth and fifth buckles 52, 54 are preferably positioned adjacent one another as a second pair of buckles (not numbered). The first pair of buckles, i.e., the second and third buckles 48, 50, are preferably disposed about halfway between the first and second sides 14, 16 of the seat 12. The second pair of buckles, i.e., the fourth and fifth buckles 52, 54, are preferably disposed about a third of the way across the seat 12 from the second side 16. The first buckles 46 is preferably disposed about a third of the way across the seat 12 from the first side 14.

A clip 56, 58, 60 for engaging with one of the buckles 46, 48, 50, 52, 54 is coupled to each seatbelt 24, 26, 28 as is well known to one skilled in the art. Specifically, in the illustrated embodiment, a first clip 56 is coupled with the first seatbelt 24 for engaging the first buckle 46 or the second buckle 48. A second clip 58 is coupled with the second seatbelt 26 for engaging the third buckle 50 or the fifth buckle 54. A third clip 60 is coupled with the third seatbelt 28 for engaging the fourth buckle 46.

The above described correlation of specific clips to specific buckles allows the seat assembly 10 of the subject invention to securely accommodate one, two, three passengers. Specifically, the seat assembly 10 presents both a two-passenger configuration and a three-passenger configuration. Clearly, a single passenger could utilize either configuration. Furthermore, two passengers could also utilize the three-passenger configuration.

The three-passenger configuration is preferably suited for three passengers 30, 32, 34 having smaller statures, as shown in FIG. 4. In this configuration, the first, fourth, and fifth buckles 46, 52, 54, which are preferably disposed a third of the way across the seat 12 from one of the sides 14, 16 are utilized. Specifically, the first clip 56 is engageable with the first buckle 46 to secure a first passenger 30 to the seat 12 with the first seatbelt 24. The second clip 58 is engageable with the fifth buckle 54 to secure a second passenger 32 with the second seatbelt 26. The third clip 60 is engageable with the fourth buckle 52 to secure a third passenger 34 with the third seatbelt 28.

The two-passenger configuration is preferably suited for two passengers 30, 32 having larger statures, as shown in FIG. 5. In this configuration, the first clip 56 is engageable with the second buckle 48 to secure the first passenger 30 with the first seatbelt 24 and the second clip 58 is engageable with the third buckle 50 to secure the second passenger 32.

Preferably, each clip 56, 68, 60 is engageable only with certain buckles 46, 48, 50, 52, 54 to insure that each passenger 30, 32, 34 may be properly secured in the seat 12. Specifically, in the configurations of the illustrated embodiment, the first clip 56 is keyed to engage only with the first buckle 46 or the second buckle 48, the second clip 58 is keyed to engage only with the third buckle 50 or the fifth buckle 54, and the third clip 60 is keyed to engage only with the fourth buckle 52. There are numerous techniques known to those skilled in the art to accomplish the keying of the clips such that they only engage with certain buckles. For instance, each clip typically forms a hole (not numbered) which allows connection to the buckle. The size and/or position of this hole may unique to each clip 56, 58, 60 such that each clip 56, 58, 60 only engages with the proper buckle 46, 48, 50, 52, 54.

The seat assembly 10 may use a visual coding technique to match each clip 56, 58, 60 up with the proper buckle 46, 48, 50, 52, 54. The visual coding technique may be implemented as an alternative to the keying of the clips 56, 58, 70 describe above or in concert with the keying of the clips 56, 58, 60. Specifically, in the illustrated embodiment, the first clip 56 is visually coded with the first and second buckles 46, 48, the second clip 58 is visually coded with the third and fifth buckles 50, 54, and the third clip 60 is visually coded with the fourth buckle 52. The visual coding allows the passenger to quickly and easily match up each clip 56, 58, 60 with its corresponding buckle 46, 48, 50, 52, 54. As one example, the visual coding may be implemented as color coding such that at least a portion of corresponding clips 56, 58, 60 and buckles 46, 48, 50, 52, 54 have a similar color. Another example of visual coding includes text printed on or embedded on the clips 56, 58, 60 and buckles 46, 48, 50, 52, 54.

Preferably, as shown in FIGS. 2, 4, and 5, the seatback defines a plurality of cavities 62, 64, 66 for storing and housing the buckles 46, 48, 50, 52, 54 when the buckles 46, 48, 50, 52, 54 are not in use. Specifically, a first cavity 62 houses the first buckle 46, a second cavity 64 houses the second and third buckles 48, 50, and a third cavity 66 houses the fourth and fifth buckles 58. This storage allows the buckles 46, 48, 50, 52, 54 to be moved away from contact with the passengers 30, 32, 34 to enhance their comfort while seated in the seat 12. In the three-passenger configuration, the second and third buckles 48, 50 are stored to avoid contact with the third passenger 34. In the two-passenger configuration, the first buckles 46 is stored to avoid contact with the first passenger 30 and the fourth and fifth buckles 52, 54 are stored to avoid contact with the second passenger 32.

Figure 7:
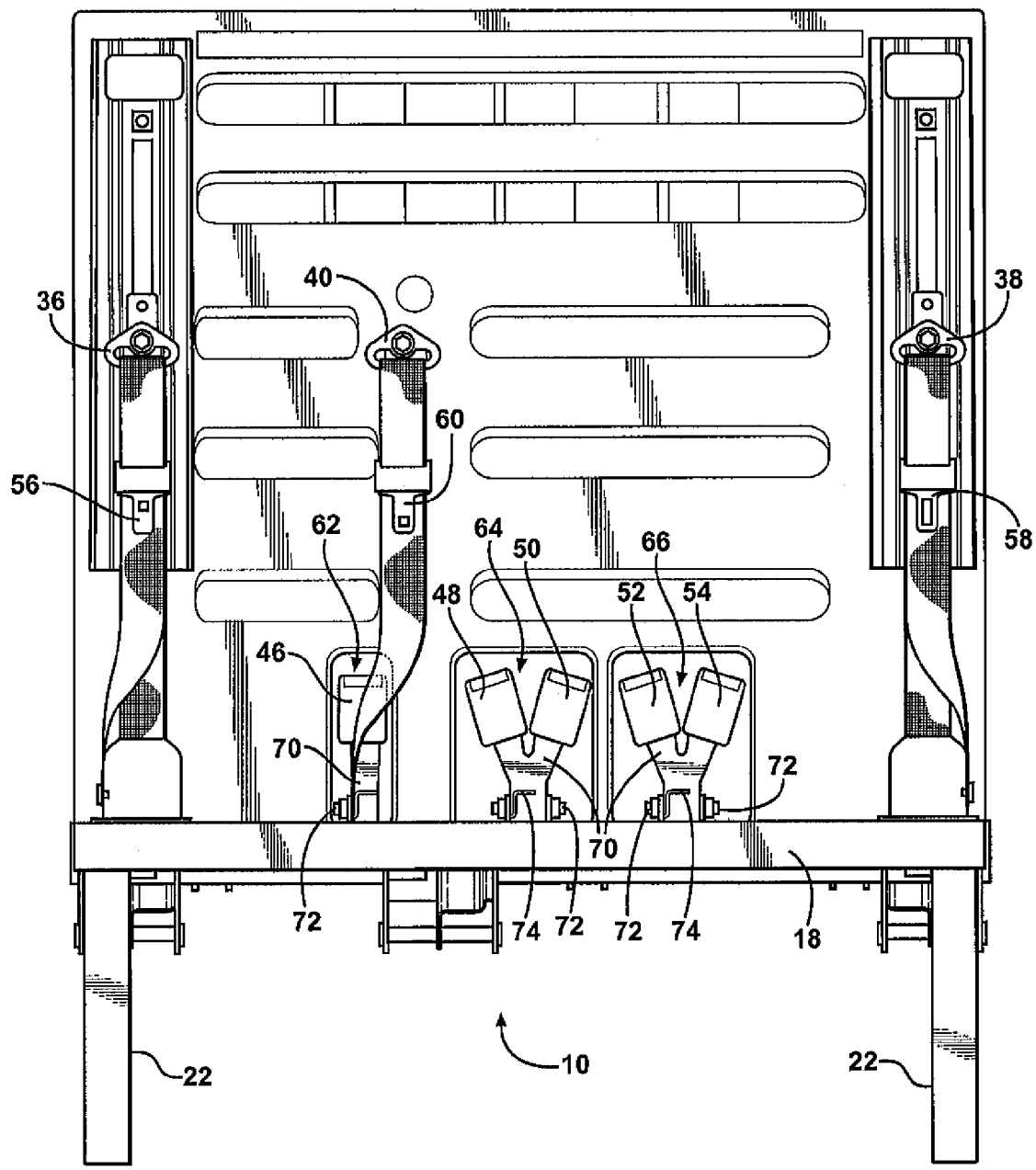
FIG. 7 is a front view of the seat assembly to show multiple buckles supported by a single stem.

The seat assembly 10 also includes a plurality of stems 70 with each stem 70 supporting at least one of the buckles 46, 48, 50, 52, 54. In one embodiment, as shown in FIGS. 1-6, each buckle 46, 48, 50, 52, 54 is supported by a single stem 70. In another embodiment, as shown in FIG. 7, the second and third buckles 48, 50 are supported by a single stem 70 and the fourth and fifth buckles 52, 54 are supported by a single stem.

The seat assembly 10 further includes a plurality of hinges 72 with each hinge 72 operatively connected to one of the stems 70. This allows the at least one buckle that is supported by the stem 70 to move between a storage position and a usage position. In the storage position, the buckle 46, 48, 50, 52, 54 is positioned in one of the cavities 62, 64, 66. Specifically, as can be seen in FIG. 2, the first buckle 46 is positioned in the first cavity 62, the second and third buckles 48, 50 are positioned in the second cavity 64, and the fourth and fifth buckles 52, 54 are positioned in the third cavity 66. In the usage position the buckle 46, 48, 50, 52, 54 is positioned out of one of the cavities 62, 64, 66.

Each stem 70, as well as the buckle or buckles 46, 48, 50, 52, 54 supported thereby, is biased toward its respective cavity 62, 64, 66 by a spring 74. Specifically, the seat assembly 10 includes a plurality of springs 74, with each spring 74 operatively connected to one of the stems 70. Therefore, when the buckle or buckles 46, 48, 50, 52, 54 are not being utilized, i.e., connected to a clip 56, 58, 60, the buckle or buckles 46, 48, 50, 52, 54 are moved into the storage position.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A seat assembly for a vehicle comprising:
 a seat defining a first side and a second side and having a seat bottom and a seatback for accommodating at least one passenger;
 a first seatbelt disposed in proximity to said first side of said seat;
 a second seatbelt disposed in proximity to said second side of said seat;
 a third seatbelt disposed between said sides of said seat and between said first and second seatbelts;
 a first buckle, a second buckle, a third buckle, a fourth buckle, and a fifth buckle disposed in proximity to said seat and arranged sequentially from said first side of said seat to said second side of said seat;
 a first clip coupled with said first seatbelt and engagable with said first and second buckles for securing a first passenger in said seat with said first seatbelt;
 a second clip coupled with said second seatbelt and engageable with said third and fifth buckles for securing a second passenger in said seat with said second seatbelt; and
 a third clip coupled with said third seatbelt and engageable with said fourth buckle for securing a third passenger in said seat with said third seatbelt; and
 wherein said first clip is engageable only with said first and second buckles, said second clip is engageable only with said third and fifth buckles, and said third clip is engageable only with said fourth buckle.

2. A seat assembly as set forth in claim 1 wherein said first clip is engageable with said first buckle in a three-passenger configuration and engageable with said second buckle in a two-passenger configuration.

3. A seat assembly as set forth in claim 1 wherein said second clip is engageable with said fifth buckle in a three-passenger configuration and engageable with said third buckle in a two-passenger configuration.

4. A seat assembly as set forth in claim 1 wherein said first clip is visually coded with said first and second buckles, said second clip is visually coded with said third and fifth buckles, and said third clip is visually coded with said fourth buckle.

5. A seat assembly for a vehicle comprising:
 a seat defining a first side and a second side and having a seat bottom and a seatback for accommodating at least one passenger;
 a first seatbelt disposed in proximity to said first side of said seat;
 a second seatbelt disposed in proximity to said second side of said seat;
 a third seatbelt disposed between said sides of said seat and between said first and second seatbelts;
 a first buckle, a second buckle, a third buckle, a fourth buckle, and a fifth buckle disposed in proximity to said seat and arranged sequentially from said first side of said seat to said second side of said seat;
 a first clip coupled with said first seatbelt and engagable with said first and second buckles for securing a first passenger in said seat with said first seatbelt;
 a second clip coupled with said second seatbelt and engageable with said third and fifth buckles for securing a second passenger in said seat with said second seatbelt; and
 a third clip coupled with said third seatbelt and engageable with said fourth buckle for securing a third passenger in said seat with said third seatbelt; and
 wherein said seatback defines a plurality of cavities for storing said buckles when said buckles are not in use.

6. A seat assembly as set forth in claim 5 wherein said plurality of cavities is further defined as a first cavity for storing said first buckle, a second cavity for storing said second buckle and said third buckle, and a third cavity for storing said fourth buckle and said fifth buckle.

7. A seat assembly as set forth in claim 6 further comprising a plurality of stems with each stem supporting at least one of said buckles.

8. A seat assembly as set forth in claim 7 further comprising a plurality of hinges with each hinge operatively connected to one of said stems for allowing said at least one buckle to move between a storage position where said buckle is positioned in one of said cavities and a usage position where said buckle is positioned out of one of said cavities.

9. A seat assembly as set forth in claim 8 further comprising a plurality of springs with each spring operatively connected to one of said stems for biasing said at least one buckle toward said cavity.

10. A seat assembly as set forth in claim 7 wherein said plurality of stems is further defined as a first stem supporting said first buckle, a second stem supporting said second buckle, a third stem supporting said third buckle, a fourth stem supporting said fourth buckle, and a fifth stem supporting said fifth buckle.

11. A seat assembly as set forth in claim 7 wherein said plurality of stems is further defined as a first stem supporting said first buckle, a second stem supporting said second buckle and said third buckle, and a third stem supporting said fourth buckle and said fifth buckle.

12. A seat assembly for a vehicle comprising:
 a seat defining a first side and a second side and having a seat bottom and a seatback for accommodating at least one passenger;
 a first seatbelt disposed in proximity to said first side of said seat;
 a second seatbelt disposed in proximity to said second side of said seat;
 a third seatbelt disposed between said sides of said seat and between said first and second seatbelts;
 a first buckle, a second buckle, a third buckle, a fourth buckle, and a fifth buckle disposed in proximity to said seat and arranged sequentially from said first side of said seat to said second side of said seat;
 a first clip coupled with said first seatbelt and engagable with said first and second buckles for securing a first passenger in said seat with said first seatbelt;
 a second clip coupled with said second seatbelt and engageable with said third and fifth buckles for securing a second passenger in said seat with said second seatbelt;
 a third clip coupled with said third seatbelt and engageable with said fourth buckle for securing a third passenger in said seat with said third seatbelt; and
 a first shoulder retainer receiving said first seatbelt, a second shoulder retainer receiving said second seatbelt, and a third shoulder retainer receiving said third seatbelt for allowing said seatbelts to engage a shoulder area of said at least one passenger.

13. A seat assembly as set forth in claim 12 further comprising a first belt height adjuster supporting said first shoulder retainer while allowing adjustment of said first shoulder retainer for accommodating various sizes of the first passenger.

14. A seat assembly as set forth in claim 13 further comprising a second belt height adjuster supporting said second shoulder retainer while allowing adjustment of said second shoulder retainer for accommodating various sizes of the second passenger.

* * * * *